Figure 1:
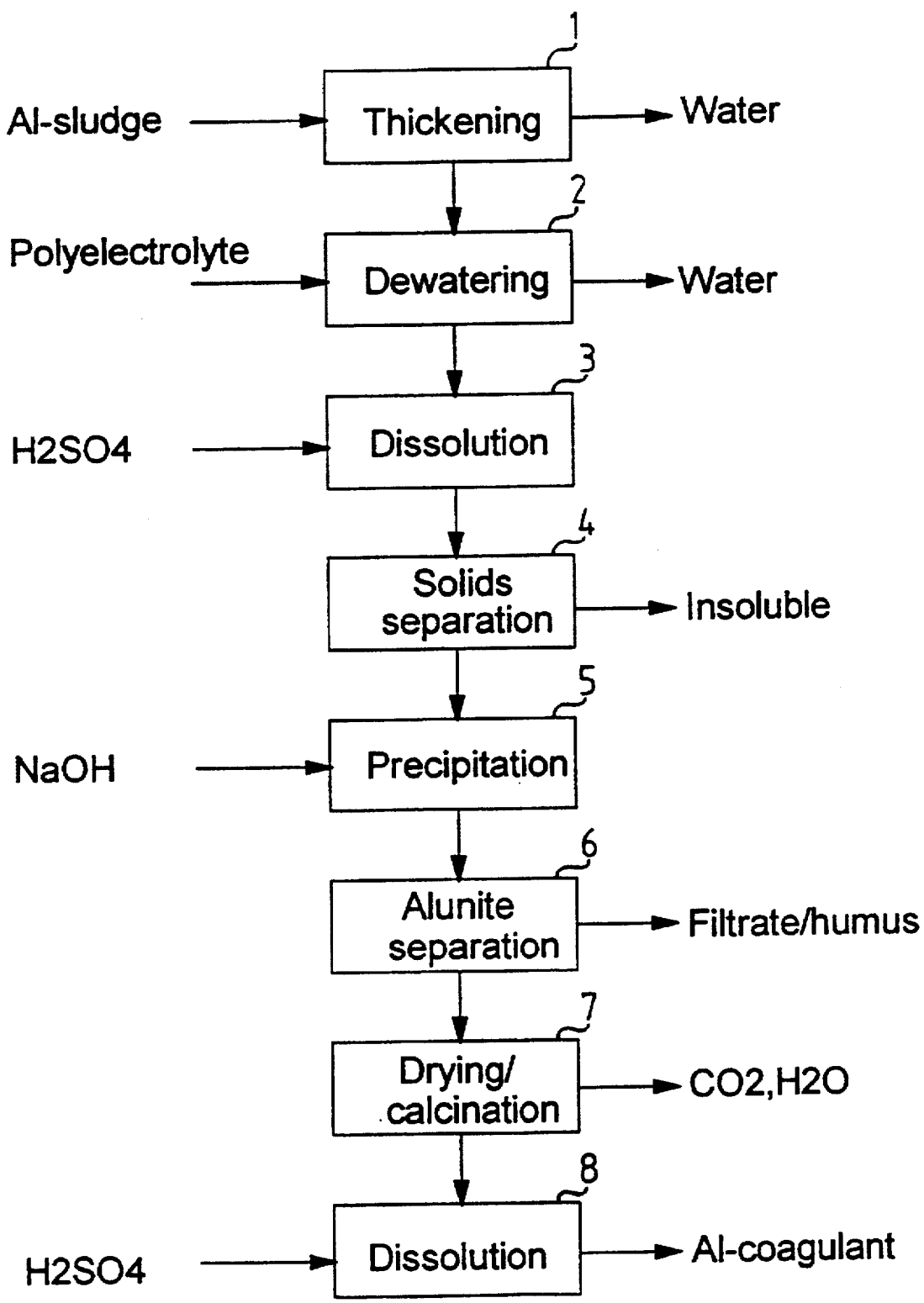

United States Patent [19]

Nilsson et al.

[11] Patent Number: 5,674,402
[45] Date of Patent: Oct. 7, 1997

[54] METHOD FOR THE TREATMENT OF WATER TREATMENT SLUDGE

[75] Inventors: Rolf Nilsson, Mölle, Sweden; Simo Jokinen, Oulu, Finland

[73] Assignee: Kemira Kemi Ab, Sweden

[21] Appl. No.: 564,212

[22] PCT Filed: Jun. 16, 1994

[86] PCT No.: PCT/FI94/00262

§ 371 Date: May 17, 1996

§ 102(e) Date: May 17, 1996

[87] PCT Pub. No.: WO95/00446

PCT Pub. Date: Jan. 5, 1995

[30] Foreign Application Priority Data

Jun. 17, 1993 [FI] Finland ............... 932798

[51] Int. Cl.⁶ .............. C02F 11/00; C02F 1/52
[52] U.S. Cl. .............. 210/711; 210/770
[58] Field of Search .............. 210/711, 770

[56] References Cited

U.S. PATENT DOCUMENTS

| | | |
|---|---|---|
| 3,268,443 | 8/1966 | Cann. |
| 3,347,786 | 10/1967 | Baer et al.. |
| 3,959,133 | 5/1976 | Fulton .............. 210/711 |
| 4,024,087 | 5/1977 | Lainer et al. .............. 423/556 |
| 4,038,180 | 7/1977 | Talbert .............. 210/711 |
| 4,039,615 | 8/1977 | Mikami et al.. |
| 4,176,160 | 11/1979 | Pavonet .............. 423/104 |
| 4,448,696 | 5/1984 | White, Jr.. |
| 4,717,484 | 1/1988 | Käuffer .............. 210/711 |

FOREIGN PATENT DOCUMENTS

| | | |
|---|---|---|
| 164098 B | 5/1986 | Denmark. |
| 0 087 268 A3 | 8/1983 | European Pat. Off.. |
| 2366/74 | 7/1975 | Finland. |
| 65217 | 11/1979 | Finland. |
| 52-24190 | 2/1977 | Japan. |
| 2 212 486 | 7/1989 | United Kingdom. |

OTHER PUBLICATIONS

Masides et al., "A Feasibility Study of Alum Recovery in Wastewater Treatment Plants", *Wat. Res.*, vol. 22, No. 4, pp. 399–405, 1988 (abstract and article).

Abdo et al., "Recovery of Alum from Wasted Sludge Produced from Water Treatment Plants", *J. Environ. Sci. Health, Part A*, vol. A28, No. 6, pp. 1205–1216, 1993 (abstract).

*Primary Examiner*—Neil McCarthy
*Attorney, Agent, or Firm*—Nath & Associates; Gary M. Nath; Suet M. Chong

[57] ABSTRACT

A method for the treatment of sludge obtained from such a water treatment process wherein an aluminium or iron chemical is used as a coagulant, so as to reduce the amount of sludge, which method comprises the steps of:

a) treating the water treatment sludge with an inorganic acid to produce an acidic sludge comprising dissolved aluminium or iron, b) optionally separating insoluble material from the acidic sludge to produce an acidic solution comprising dissolved aluminium or iron, c) treating said acidic sludge or said acidic solution with a +1-cation compound in the presence of sulphate ions in such conditions that the pH of the sludge or solution remains at a level where aluminium precipitates as an alunite compound or iron precipitates as a jarosite compound, and d) separating the precipitated alunite or jarosite compound from the remaining sludge.

37 Claims, 3 Drawing Sheets

METHOD FOR THE TREATMENT OF WATER TREATMENT SLUDGE

The invention relates to a method for the treatment of sludge obtained from such a water treatment process wherein an aluminium or iron chemical is used as a coagulant, so as to reduce the amount of sludge to be disposed or dumped and to recover aluminium or iron in a useful form. The invention particularly deals with sludge obtained from a drinking water purification process.

Dumping of waste water sludge and drinking water sludge is a major problem in water purification plants. It is difficult to find suitable places for the waste and as standards rise landfilling is becoming more and more expensive. From this perspective the idea of recycling the waste water sludge is becoming increasingly important. Recycling involves treatment of the sludge to recover coagulant chemicals, particularly iron and aluminium, used in the water purification plant.

Aluminium and iron are the most commonly used coagulant chemicals in water purification. When e.g. aluminium sulphate or ferric sulphate is dissolved in water positively charged metal-ions are generated which attract impurities in the water such as colloids, humus and suspended particles which are all negatively charged. At the same time metal hydroxide flocs are formed by hydrolysis. The impurities are captured by the flocs and a sludge consisting of metal hydroxide and impurities is formed. Practically all coagulant added in water purification remains in the sludge. The coagulant content of a sludge is typically 100–200 kg metal/tn dry solids.

The patent publication U.S. Pat. No. 3,959,133 discloses such a method for recovering aluminium from a sludge containing aluminium hydroxide. The sludge is first acidulated with sulphuric acid. When sulphuric acid is added to a sludge containing $Al(OH)_3$ aluminium sulphate, in a soluble form, will be formed. Then the sludge is conditioned with an inert additive to facilitate the subsequent filtering. The filtrate is then separated from the remaining sludge. The alum in the filtrate is returned to the water treatment system. The obvious drawback with this method is that all acid soluble impurities of the solution are also returned to the coagulation stage which leads to a gradual enrichment of metallic impurities in the recycle. Also part of the insoluble organic impurities which cannot be removed by filtering are also returned to the coagulation stage.

The patent publication EP 0 087 268 A3 discloses a process for treating sludge produced by a water treatment process. The process comprises adding acid to the sludge to produce a acidulated sludge. The sludge is then filtered to yield a recovered coagulant filtrate. This is then recycled so as to effect flocculation in untreated raw water. The coagulants mentioned in this publication are aluminium sulphate and ferric sulphate. It is typical of this process that acid is added only in an amount which is sufficient to convert only part (40%) of the coagulant to an acid soluble form. In this way the amount of impurities in the recycle can be reduced. However, this method does not solve the problem of impurities. There still remains soluble impurities in the recycle. The only way to further reduce the impurity level is to use less acid. This in turn leads to a situation where more coagulant will be discarded and the economy of the method is consequently reduced.

The dry solids content of a drinking water sludge is typically only about 0.2%. Therefore the water content of the sludge is often reduced before the dissolution stage. It is possible to raise the dry solids content to about 1.0% by sedimentation. By adding a polyelectrolyte and performing a mechanical dewatering, the dry solids content of the drinking water sludge can be further increased to a level of 10–15%. In the so-called "dry method" the mechanically dewatered sludge is dried and finally incinerated at temperatures between 400° C.–600° C. so that all organic material i.e. humus can be removed. In the case of aluminium chemicals, aluminium can by adding sulphuric acid to the incinerated residue be dissolved into aluminium sulphate. The percentage of recovered aluminium is high but the method suffers from high energy costs due to heating. A large amount of water has to be evaporated because this kind of sludge generally is very difficult to dewater by mechanical means. Although organic impurities can be removed inorganic impurities remain. The incinerated product contains a significant amount of iron, in one exemplary case about 1.0% of the amount of aluminium so that the ratio Al/Fe=10.

Impurity accumulation in the coagulant is the main drawback with the prior art methods. Furthermore, coagulation efficiency of the recovered coagulants are not comparable with that of a fresh aluminium or iron chemical because there are always humus compounds present in the solution, part of them being soluble in acids and part in bases. Thus it is not possible to remove all organic material by dissolution and subsequent filtering. Also the methods of prior art require the recovered coagulants to be recycled in the same process. This limits the possibilities to use the recovered coagulants. Recovering coagulants from one process and using them in another process would not be economically feasible due to transportation costs. Therefore, the obstacles which prevent the prior art techniques from being exploited are the following: metallic and organic impurities are present in the recovered coagulant and they tend to enrich in the coagulation recycle, the coagulation efficiency is reduced by the remaining organic impurities and the method is only applicable as a recycling process.

The ultimate objective of this invention is to solve the sludge problem in water purification plants by making the recycling scheme more profitable. The objective is to utilize the useful part of the waste and simultaneously to minimize the amount of remaining waste to be dumped. The objective is not to find a new raw material that would compete with pure and fairly cheap aluminium and iron raw materials used in the manufacture of commercial coagulants but to solve the sludge problem. Therefore, one objective of the invention is to provide a method for reducing the amount of sludge to be disposed and for recovering coagulant chemicals free from impurities. Another objective is to provide a method whereby the coagulant chemicals could be recovered and used, besides recycling in the same process, also in any desired purification process. These objectives can be accomplished by the present invention, and therefore the present invention provides a method for the treatment of sludge obtained from such a water treatment process wherein an aluminium or iron chemical is used as a coagulant, so as to reduce the amount of sludge, said method comprising the steps a) treating the water treatment sludge with an inorganic acid to produce an acidic sludge comprising dissolved aluminium or iron, b) optionally separating insoluble material from the acidic sludge to produce an acidic solution comprising dissolved aluminium or iron, c) treating said acidic sludge or said acidic solution with with a +1-cation compound like an alkali compound in the presence of sulphate ions in such conditions that the pH of the sludge or solution remains at a level where aluminium precipitates as an alunite compound or iron precipitates as a jarosite compound, and d) separating the precipitated alunite or jarosite compound from the remaining sludge.

According to the invention either the acidic solution from the dissolution stage, which contains dissolved aluminium or iron and from which insoluble material has been removed, or alternatively the acidic sludge from the dissolution stage containing dissolved aluminium or iron is treated in the precipitation stage with a +1-cation compound like an alkali compound, preferably with a sodium compound, in presence of sulphate ions in such conditions that the pH of the solution or the sludge remains on the level where an alunite compound advantageously sodium alunite or a jarosite compound advantageously sodium jarosite precipitates. The cation of the +1-cation compound is preferably a potassium, sodium, ammonium or oxonium ion.

Generally alunite compounds are double salts of the form $MAl_3(SO_4)_2(OH)_6$ where M is $K^+$, $Na^+$, $NH_4^+$ or $H_3O^+$. Sodium alunite is normally written in the form $NaAl_3(SO_4)_2(OH)_6$.

Correspondingly, jarosite compounds are double salts of the similar form but Al is replaced by trivalent Fe.

An inorganic acid, preferably sulphuric acid, is used in the dissolution stage and the sulphate ions present in the precipitation stage come from the sulphuric acid.

In the case of alunite, the precipitation is typically performed at a pH between 0.5 and 4, preferably between 1 and 4, at a temperature between 100° C. and 170° C., preferably between 130° C. and 150° C., and at a pressure between 1 bar and 10 bar, preferably between 2 bar and 5 bar. The reaction time is typically between 0.5 h and 7 h, preferably between 1 h and 3 h. At these pH values $Al(OH)_3$ does not precipitate.

In the case of jarosite, the precipitation is typically performed at a pH between −1 and 4, preferably between 0 and 4, at a temperature between 100° C. and 170° C., preferably between 130° C. and 140° C., and at a pressure between 1 bar and 10 bar, preferably between 5 bar and 7 bar. The reaction time is typically between 0.5 h and 7 h, preferably between 1 h and 3 h.

The sodium compound used in the precipitation is preferably sodium hydroxide. The sodium compound can also be a sodium salt like sodium sulphate and then in the precipitation stage an alkali like calcium hydroxide, calcium oxide, magnesium hydroxide or magnesium oxide is added if needed.

In the aluminium dissolution stage, sulphuric acid dissolves the aluminium hydroxide of the sludge into soluble aluminium sulphate. Dissolution can be presented with the following reaction equation:

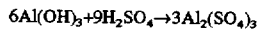
$6Al(OH)_3+9H_2SO_4\rightarrow 3Al_2(SO_4)_3$

In the precipitation stage following reactions take place:

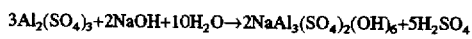
$3Al_2(SO_4)_3+2NaOH+10H_2O\rightarrow 2NaAl_3(SO_4)_2(OH)_6+5H_2SO_4$

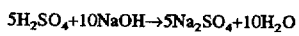
$5H_2SO_4+10NaOH\rightarrow 5Na_2SO_4+10H_2O$ and the precipitation stage altogether:

$3Al_2(SO_4)_3+12NaOH\rightarrow 2NaAl_3(SO_4)_2(OH)_6+5Na_2SO_4$

Acid is released during precipitation which lowers pH. This halts the reaction when pH lowers to a value of about 0.5. To prevent this pH must be adjusted during the reaction. Precipitation takes place within a pH range 0.5–4 and the rate of reaching the equilibrium is dependent on the reaction temperature. If pH is higher than 4, Al hydroxide starts to precipitate which is not desired since the properties of Al hydroxide are far worse than those of aluminium sulphate. Being difficult to filter water remains in the precipitate and the concentration of Al is consequently low.

The alunite precipitation is preferably performed at 130°–150° C. The rate of alunite precipitation is the faster the higher the temperature. A sodium compound is used in the precipitation so that the number of moles of added Na is at least ⅓ of the number of moles of Al in the liquid.

If a sodium salt like sodium sulphate is used in the precipitation, the precipitation stage can be described with the following reaction equation:

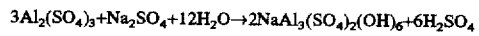
$3Al_2(SO_4)_3+Na_2SO_4+12H_2O\rightarrow 2NaAl_3(SO_4)_2(OH)_6+6H_2SO_4$ There are two alternative ways of adding sulphuric acid into the system. The first alternative is to bring sulphuric acid to the system only such an amount which is sufficient to dissolve partly the sludge in order to get Al- and sulphate ions. At the same time sodium is added to the system as sulphate or hydroxide so that the number of Na moles is at least ⅓ of the number of Al moles. When the temperature is raised, sodium alunite starts to precipitate. The precipitation of sodium alunite creates free sulphuric acid, which in turn dissolves more Al-hydroxide:

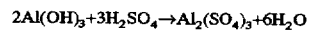
$2Al(OH)_3+3H_2SO_4\rightarrow Al_2(SO_4)_3+6H_2O$

$3Al_2(SO_4)_3+2Na^++6H_2O\rightarrow 2NaAl_3(SO_4)_2(OH)_6+5H_2SO_4+2H^+$ The overall reaction is then

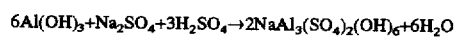
$6Al(OH)_3+Na_2SO_4+3H_2SO_4\rightarrow 2NaAl_3(SO_4)_2(OH)_6+6H_2O$

The reaction goes on as long as there is undissolved aluminium hydroxide left, after which the pH value settles down to a specific level. In this procedure there is no filtration in between but all insoluble material remains in the product. This method is advantageous in that only small quantities of chemicals are required. A minimum need of sulphuric acid is 0.5 mol/mol Al (1.815 g $H_2SO_4$/g Al).

The second alternative is first to dissolve all aluminium hydroxide into a soluble form by sulphuric acid. Then the soluble aluminium is precipitated by adding sodium and some base. This treatment method is advantageous in that a more pure product is obtained since the solution can be filtered before precipitation. On the other hand, the drawback with this method is that it consumes more chemicals. The need of sulphuric acid is 1.5 mol/mol Al (5.44 g $H_2SO_4$/g Al).

Iron can be precipitated by the analogical process but the compound to be precipitated is jarosite:

$3Fe^{3+}+Na^++2SO_4^{2-}+6OH^-\rightarrow NaFe_3(SO_4)_2(OH)_6$

All the reactions presented above are also valid for iron if Al is replaced by Fe. As in the case of alunite, there are two alternative ways of precipitating jarosite. In the first alternative sulphuric acid is used only enough to form a suitable amount of ferric sulphate in the batch. At the same time a sodium salt is added (e.g. sodium sulphate) so that the number of Na moles is at least ⅓ of the number of $Fe^{3+}$ moles. When the temperature is raised, sodium jarosite starts to precipitate according to the above reaction. The reaction produces sulphuric acid (pH decreases). This in turn dissolves new ferric hydroxide of the sludge into ferric sulphate. This goes on as long as there is undissolved ferric hydroxide left, after which the pH value settles down to a specific level. In the second alternative all ferric hydroxide is first dissolved into a soluble form by sulphuric acid. Then the soluble ferric iron is precipitated by adding sodium and some base. The precipitation is preferably performed in the presence of an oxidant like oxygen. The oxidant oxidizes Fe(II) to Fe(III) and prevents reduction of Fe(III) to Fe(II).

The method of the invention makes it possible to recover aluminium in a fairly pure state free of metallic impurities like iron or possible heavy metals. Major part of these impurity metals does not precipitate with alunite but remains in the solution. Precipitation yield in terms of recovered aluminium is typically 90–99%.

Correspondingly the method of the invention makes it possible to recover iron in a fairly pure state free of metallic impurities like heavy metals. Major part of these impurity metals does not precipitate with jarosite but remains in the solution.

According to one embodiment of the invention the precipitation stage is followed by solids separation e.g. filtering. In the case of alunite, the filtrate contains iron and organic material. The solids content of the precipitate is 40–70% depending on the method of separation (filtering, centrifugation etc.). The precipitate contains about 16% Al and 5–7% organic humus calculated to carbon. According to another embodiment of the invention the amount of acid insoluble material can be further reduced by performing counterflow washing with NaOH so that the NaOH used for washing is returned to the precipitation stage. In this way the level of TOC can be lowered to 2%.

According to a third embodiment of the invention the precipitate is dried and/or calcined. Organic material is transformed to carbon dioxide at a burning temperature of about 300°–500° C. In the case of alunite, the aluminium content of the remaining dry precipitate is 24–30%. Calcining also destroys the crystal structure of alunite making it amorphous which improves solubility of the aluminium precipitate in acids.

In the method of the invention the dry solids content of the water purification sludge preferably exceeds 1% by weight.

Figure 2:
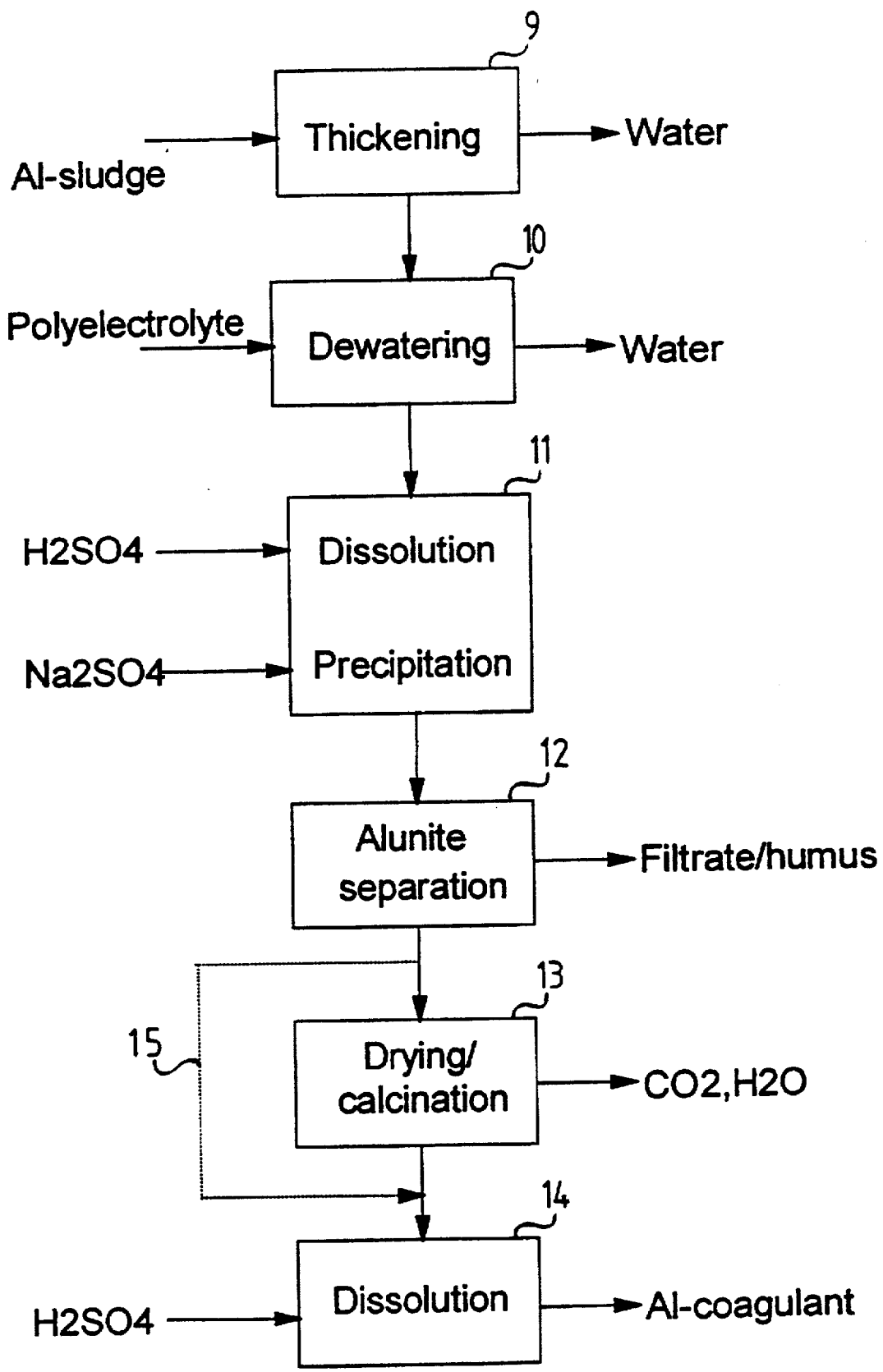
Figure 3:
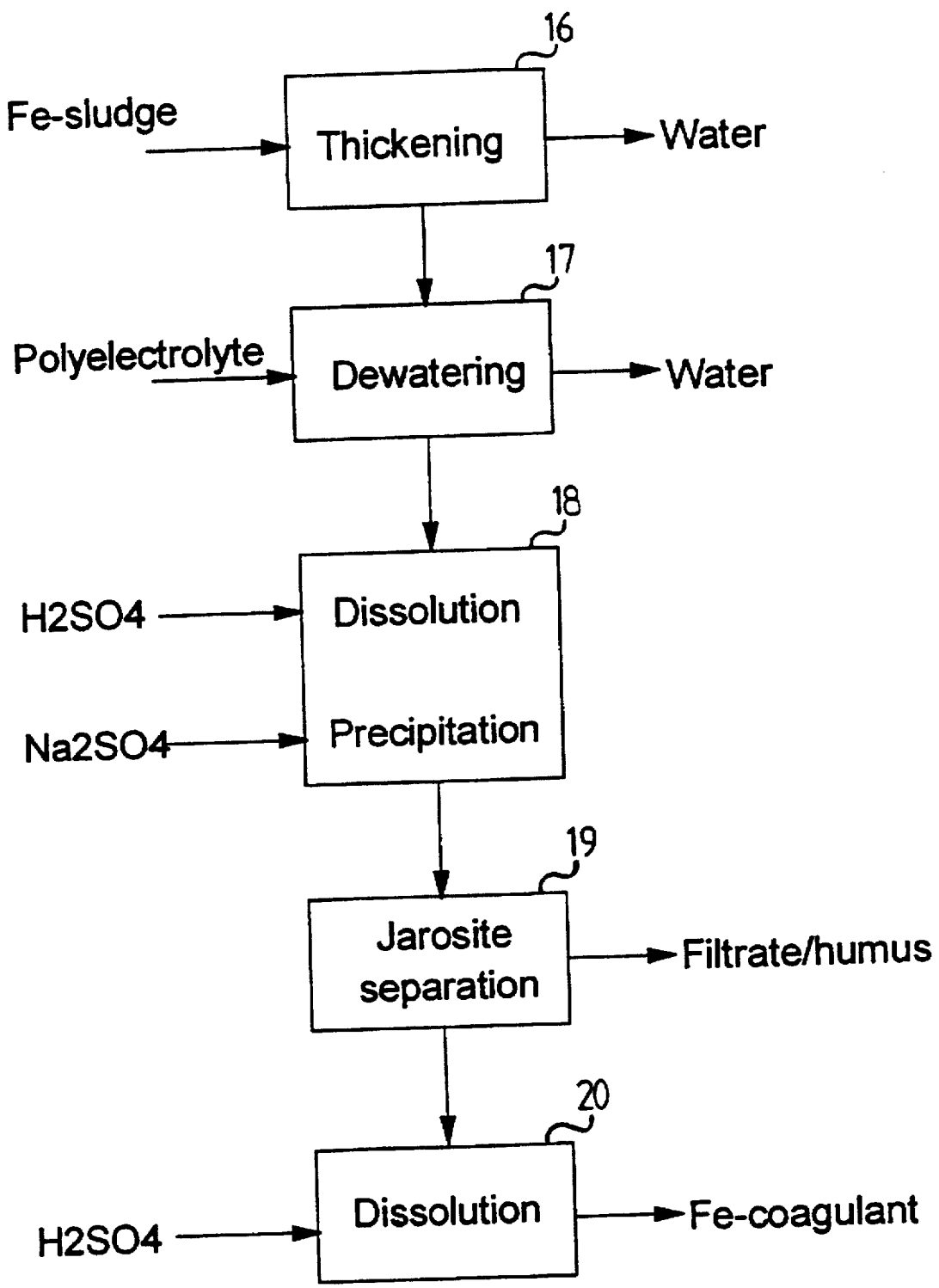

In the following, the invention will be described in more details referring to the enclosed drawings, in which FIG. 1 presents a first embodiment of the method of the invention as a block diagram, FIG. 2 presents a second embodiment of the method of the invention as a block diagram and FIG. 3 presents a third embodiment of the method of the invention as a block diagram.

As shown in FIG. 1, the Al-containing sludge formed in the purification of drinking water is first passed to a thickening stage 1. Water is discarded from the thickening stage 1 and the settled sludge is passed to a dewatering stage 2 where a polyelectrolyte is added to the sludge. This aids separation of solids and water is conducted away. After the dewatering stage 2 the dry solids content of the sludge has reached a typical level of 10–15%. Next the sludge is passed to a dissolution stage 3 where acid like concentrated $H_2SO_4$ is added to the sludge. The temperature in the dissolution stage 3 is the ambient room temperature. Dissolution takes place at pH <4, completely at pH <2. The material insoluble in the sulphuric acid is removed in the solids separation stage 4. Along with the insoluble material a substantial part of organic material, which is insoluble in the sulphuric acid, is also removed in the solids separation stage 4. A centrifuge is typically used for the solids separation. It is also possible that the solids are not separated in this stage at all. In this case, the insolubles are separated together with alunite i.e. in the alunite separation stage 6.

The solution obtained from the solids separation stage 4 contains essentially all the aluminium of the original sludge in soluble form. The solution which is passed to the precipitation stage 5 also contains the humus dissolved in the dissolution stage 3. Aluminium is separated from this solution in the precipitation stage 5 wherein NaOH is added to the solution for precipitating aluminium as sodium alunite. Addition of NaOH has a twofold purpose, firstly it brings the necessary Na into the solution and secondly it raises the pH to a level (pH 0,5–4) where precipitation takes place. It should be emphasized that the amount of aluminium remaining in the solution is small and so a significant enrichment of aluminium is achieved in the precipitation stage 5. The precipitated alunite is separated in the alunite separation stage 6. The alunite precipitate is crystalline and it can be readily filtered which greatly facilitates recovery of aluminium. Therefore, the amount of mother liquor remaining in the precipitate is extremely small and a dry solids content as high as 40–70% can be reached in the separated precipitate (depending on the method). It is to be noted that, in the precipitation stage 5, trivalent iron reduces to divalent iron which will not precipitate along with aluminium but remains in the solution. Therefore the ratio Al/Fe of the precipitate is typically of the order 160. Also other divalent metals remain in the solution.

Most of the dissolved humus is removed along with the filtrate in the alunite separation stage 6. The precipitate obtained from the alunite separation stage 6 contains some acid soluble humus that precipitates at the conditions which exist in the precipitation stage. The amount of alkali soluble humus can be reduced to some extent by washing the precipitate with a NaOH solution in a washing stage (not shown in FIG. 1) so that the used washing solution is returned to the precipitation stage 5. The organic fraction which exists as a co-precipitate in the alunite and which is soluble in bases i.e. the fulvous acid fraction dissolves in the washing stage and is removed from the precipitate. Washing is performed in a counterflow fashion with an alkaline solution which is returned to the precipitation stage 5. In this way, an internal recycle of the process is accomplished. In the washing stage, the carbon content of the organic decreases from the level 5–7% to that of 2% calculated from the dry solids. The washing stage is useful in the case that the washed precipitate is dissolved in acid.

An alternative method to reduce the organic content in alunite is the calcination of the alunite precipitate. In FIG. 1, this is performed in the calcining stage 7. A temperature of 300°–600° C. is used in the calcining stage 7. At this temperature all organic material burns and, at the same time, hydroxyl groups of alunite are removed leaving an amorphous precipitate which easily dissolves in acid. Therefore, calcining brings along two advantages: organic material is totally removed from the precipitate and the solubility of the precipitate is improved.

If the process comprises a calcining stage 7, there is another possible procedure mentioned earlier. The dissolution stage 3 is followed by the precipitation stage 5, alunite separation stage 6 and the calcining stage 7. There is no solids separation stage 4 at all. In this alternative method, the precipitate is accompanied by more organic material since no separation of insolubles was performed. This organic material functions as a fuel in the calcining stage 7. However, insoluble impurities like clay will remain in the precipitate.

Pure calcined alunite is finally dissolved in sulphuric acid in the alunite dissolution stage 8 giving a solution of aluminium sulphate which can be used as a coagulant chemical in water purification or for producing other Al products.

FIG. 2 shows a block diagram of another alternative method for precipitating sodium alunite. First there is the thickening stage 9 followed by the dewatering stage 10. In the dissolution/precipitation stage 11, a sufficient amount of sulphuric acid is added to the sludge to form a suitable amount of aluminium sulphate. $Na_2SO_4$ is also added in the precipitation stage 11 so that the mole ratio Na:Al is at least ⅓. When the temperature is raised, the above described reaction starts and continues as long as all aluminium hydroxide of the sludge has dissolved and precipitated as sodium alunite. The dissolution/precipitation stage 11 is followed by the alunite separation stage 12, drying/calcining stage 13 and finally the dissolution stage 14 of the calcined sodium alunite.

Naturally, it is also possible to pass completely the drying/calcination stage 13 and dissolve the obtained wet sodium alunite in an acid. This alternative is indicated with a dashed line 15 in FIG. 2.

FIG. 3 shows a block diagram of a third embodiment of the invention. This is similar to the method presented in FIG. 2 except for that Fe-containing sludge is used instead of Al-containing sludge. In this case, the sludge is from a water purification process where an iron chemical is used as a coagulant. First there is the thickening stage 16 followed by the dewatering stage 17. A polyelectrolyte may be added at this stage to enhance dewatering. In the dissolution/precipitation stage 18 a sufficient amount of sulphuric acid is added to the sludge to form a suitable amount of ferric sulphate. $Na_2SO_4$ is also added in this stage so that the mole ratio Na:Fe is at least ⅓. When the temperature is raised, the reaction described above starts and continues as long as all iron hydroxide of the sludge has dissolved and precipitated as sodium jarosite. It has to be taken care e.g. by oxidation that iron remains in the trivalent state. The dissolution/precipitation stage 18 is followed by the jarosite separation stage 19 and finally the dissolution stage 20. In this stage 20 the pure jarosite is dissolved with sulphuric acid and the solution obtained is used as a Fe-coagulant.

The invention will be further illustrated by means of eight examples which are briefly summarized. Example 1 includes two experiments for precipitating alunite and testing the purity of the product. Example 2 includes three experiments for making alunite using different amounts of sulphuric acid. Example 3 demonstrates the effect of washing with NaOH in removing organic material. Example 4 presents results from coagulation tests showing the effect of alunite as a water treatment chemical. Example 5 is a comparative example presenting purification tests when acidified sludge as such (without precipitation of the coagulant chemical) is used as coagulant. Example 6 presents experiments wherein jarosite was precipitated from a Fe-containing sludge. Example 7 presents tests wherein jarosite was precipitated from a drinking water sludge. Example 8 includes coagulation experiments where a ferric coagulant obtained from precipitated jarosite is compared with a commercial ferric chemical.

EXAMPLE 1

In this example two different experiments, hereinafter referred to as Experiment 2 and 3, are presented. In these experiments two different methods were tested for precipitating alunite. In Experiment 2 the raw sludge was first acidified, then filtered and the filtrate obtained was used as the raw material in the precipitation of alunite. In Experiment 3, the raw material was acidified with a smaller amount of $H_2SO_4$ and the acidified sludge was used as the raw material in the precipitation of alunite. Experiment 3 had an additional purpose: heavy metals were added into the sludge and the heavy metal distribution between the precipitated product and the filtrate was analyzed. Hence, the additional purpose was to find out whether the heavy metals co-precipitate with alunite or not.

Both experiments were performed in pilot scale. The raw material was a dewatered sludge from a city water works where aluminium sulphate was used as the coagulant chemical. The sludge was pumped from the bottom of a sludge basin and filtrated with a belt filter. A 100 l autoclave was used in the experiments. Heating was conducted in a following way: A reaction mixture was first heated to about 128° C. using low pressure steam and then the temperature was raised to about 146° C. by a liquid gas fuelled steam generator.

Experiment 2 was conducted by first dissolving the sludge in sulphuric acid (96%) until pH was 1.52. The volume of the batch doubled because of foaming during dissolving. Then the slurry was filtered with a pressure filter. The analytical results of the filtrate solution obtained are presented in Table 1. In is to be noted that the amount of Al in the suspended solids (SS) of the filtrate constituted 1.3% of the total Al in the starting sludge.

TABLE 1

Analysis of the filtrate obtained after acidification and filtration in Experiment 2 and the analysis of the sludge (in dry solids) used in Experiment 3.

|    | Filtrate | Sludge  |
|----|----------|---------|
| Al | 2.4%     | 18.5%   |
| Na |          | 0.0032% |
| S  | 3.8%     | 0.8%    |
| Fe |          | 0.36%   |
| C  | 1.91%    | 21%     |
| SS | 0.67%    |         |
| Cr |          | 10 ppm  |
| Ni |          | <9 ppm  |
| Cd |          | <0.3 ppm|
| Pb |          | <11 ppm |

The filtrate (37 kg) was poured into the autoclave and heating was started. When 130° C. was reached, feeding of NaOH (48% 6 kg, 2.88 kg as 100%) was started. It was stopped when pH started rising (1 h 50 min). Total amount of the batch after the reaction was 37.6 kg. The amount of precipitate and filtrate was 3720 g and 31940 g, respectively. XRD analysis showed that the precipitate was alunite. The analyses are presented in Table 2.

Experiment 3 was conducted in the following way. Following amounts of heavy metals were added to the sludge (35100 g with 6.4% DS): Cr 60 mg, Ni 50 mg, Cd 15 mg. Therefore the final concentration of heavy metals of the sludge were higher than the values in Table 1.

Sulphuric acid (1011 g, 96%, 2.34 g (100% $H_2SO_4$)/1 g Al) and sodium sulphate (2224 g, 20%, 1.07 g $Na_2SO_4$ (100%)/1 g Al) were then fed to the sludge (35100 g with 6.4% DS, pH 3.37) and the slurry was transferred to the autoclave. The reactor was heated to over 140° C. The overall time the batch was kept at 130° C. and over was about 1 h. The pH decreased to 1.75–1.76 during the reaction indicating the precipitation of sodium alunite. The amount of precipitate and filtrate was 2551 g and 34575 g, respectively. XRD analysis showed that the precipitate was alunite. The chemical analyses are presented in Table 2.

TABLE 2

Analysis of the alunite product and the filtrate of Experiments 2 and 3.

|    | Experiment 2 | | Experiment 3 | |
|----|---------|---------|---------|---------|
|    | Alunite | Filtrate | Alunite | Filtrate |
| Al | 15.4%   | 0.29%   | 15.7%   | 0.09%   |
| Na | 4.5%    | 2.4%    | 4.1%    | 0.21%   |
| S  | 13.0%   | 6.6%    | 13.0%   | 1.1%    |
| Fe | 0.049%  | 0.04%   | 0.066%  | 0.018%  |
| C  | 7.7%    | 1.1%    | 7.7%    | 0.68%   |
| Cr | 18 ppm  |         | 31 ppm  | 1.1 ppm |
| Ni | 10 ppm  |         | <4.5 ppm | 2.0 ppm |
| Cd | <0.4 ppm |        | <1.1 ppm | 0.42 ppm |
| Pb | <6 ppm  |         | <13 ppm | <0.53 ppm |

The molar ratios of the precipitated alunite of both experiments are presented in Table 3. Also the heavy metal concentrations are given. Except for chromium and iron, all other impurities are below the limits given for aluminium sulphate. The portion of heavy metals co-precipitating with alunite was 67% for Cr, less than 14% for Ni, less than 17% for Cd. These figures suggest that heavy metals do not accumulate in the product. The analyses in Table 2 suggest that a reasonably pure alunite product can be obtained which can be further utilized in water treatment applications. Table 3 presents the molar ratios of the product and the impurity level. It is to be noted that the 18 ppm Cr in the product (Table 3) was due to the addition of Cr into the sludge. Normally, the Cr-level of the sludge and the product is much lower.

TABLE 3

Molar ratios and impurities of the alunite.

| Molar-ratio | Theoretical | Exper. 2 | Exper. 3 |
|------|-------------|----------|----------|
| Na/Al | 0.33 | 0.34 | 0.31 |
| S/Al  | 0.67 | 0.71 | 0.70 |
| S/Na  | 2.00 | 2.08 | 2.28 |

| Impurity | Al-sulphate[1] | Exper. 2 | Exper. 3 |
|----------|----------------|----------|----------|
| Fe mg/kg | 144 | 286  | 378  |
| Cr mg/kg | 15  | 11   | 18   |
| Ni mg/kg | 15  | 6    | <3   |
| Cd mg/kg | 3   | <0.2 | <0.6 |
| Pb mg/kg | 15  | <4   | <3   |

[1]CEN Draft: Limits mg/kg aluminium sulphate, iron free

EXAMPLE 2

This example contains three experiments (batch 1, 2 and 3) wherein alunite was precipitated with a decreased amount of chemicals.

In batch 1, the raw materials were: (1) 5000 g Al-sludge with a dry solids content of 3.85%, the weight of dry solids was 192.5 g and it contained 14% Al i.e. 26.95 g, (2) sulphuric acid (100%) 48.78 g i.e. 1.81 g/g Al, and (3) sodium sulphate (12.5%) 215.6 g i.e. 1 g/g Al.

The processing was the following: First the acid was added to the sludge in an autoclave giving pH 3.44. The autoclave was then heated until the temperature was 150° C. The pumping of salt solution was started and the pumping continued for 43 min. After 32 min the autoclave was cooled and the sludge was filtered. The precipitate was filtered by a vacuum filtration device (Büchner). The dry solids content of the precipitate was 15–16% and the amount of dry solids in the precipitate was 190.8 g. Table 4 gives the analysis of the precipitate.

TABLE 4

Chemical analysis of the precipitate of batch 1.

|    | Weight % | mol % | mol/Al$_{mol}$ | Theoretical mol/Al$_{mol}$ |
|----|----------|-------|----------------|----------------------------|
| Al | 14    | 0.52 | 1    | 1    |
| Na | 2.6   | 0.11 | 0.22 | 0.33 |
| S  | 9     | 0.28 | 0.54 | 0.67 |
| Fe | 0.65  |      |      |      |
| C  | 17    |      |      |      |

According to XRD the precipitate contained the following crystalline phases: $NaAl_3(OH)_6(SO_4)_2$ and $3\ Al_2O_3 \cdot 4SO_3 \cdot (10-15)H_2O$. The distribution of the elements between the precipitate and the filtrate was that of Table 5.

TABLE 5

Distribution of the elements between the precipitate and the filtrate.

|    | Precipitate | Filtrate |
|----|-------------|----------|
| Al | 94.8% | 5.2% |
| Na | 60%   | 40%  |
| Fe | 30%   | 70%  |
| C  | 70%   | 30%  |

Most of the Al precipitated as alunite, probably partly as hydronium alunite. Part of the Al was as hydroxide. Part of iron remained in undissolved form.

In batch 2 the amount of sulphuric acid was increased by 10% to decrease the final pH. The addition of sodium sulphate was started after reaching the temperature of 130° C. The raw materials were: (1) Sludge 4390 g with a dry solids content of 10%, the dry solids containing 14% Al i.e. 61.5 g, (2) $H_2SO_4$ 123 g (100%) i.e. 2.0 g/g Al, and (3) $Na_2SO_4$ 505 g (12.5%) i.e. 63 g (100%) i.e. 1.02 g/g Al.

The processing was the following: First the sludge was acidified to pH 3.21 and then heating was started. When 130° C. was reached, feeding of sodium sulphate solution was started (after 1 hour). After 54 minutes all the solution was fed and the final pH was 2.48. After 15 minutes pH was 2.46. After half an hour cooling of the batch was started.

To facilitate filtering of the precipitate, the batch was diluted in water at a ratio 1:1, polyelectrolyte was added in an amount of 0.2–0.3 mg/g dry solids. The polyelectrolyte was Fennopol K 211. The dry solids content of the filter cake was 49.6%. The analytical results of the precipitate are given in Table 6.

TABLE 6

Chemical analysis of the precipitate of batch 2.

| 0 | Weight % | mol % | mol/Al$_{mol}$ | Theoretical mol/Al$_{mol}$ |
|----|----------|-------|----------------|----------------------------|
| Al | 13    | 0.48 | 1    | 1    |
| Na | 2.8   | 0.12 | 0.25 | 0.33 |
| S  | 10    | 0.31 | 0.65 | 0.67 |
| Fe | 0.41  |      |      |      |
| C  | 15.5  |      |      |      |

According to XRD the precipitate contained the following crystalline phases: $NaAl_3(OH)_6(SO_4)_2$ and $3\ Al_2O_3 \cdot 4SO_3$ (10–15)H$_2$O. The distribution of the elements between the precipitate and the filtrate was that of Table 7.

Major portion of the precipitate was sodium alunite, the result was better than in the previous batch. The yield of Al and purity of the product (Fe) also improved.

TABLE 7

Distribution of the elements between the precipitate and the filtrate.

|    | Precipitate | Filtrate |
|----|-------------|----------|
| Al | 95.6%       | 4.4%     |
| Na | 68.8%       | 31.2%    |
| Fe | 28.4%       | 71.6%    |
| C  | 77.7%       | 22.3%    |

In batch 3, the amount of sulphuric acid was increased to lower the pH of the batch further. Sodium sulphate was dosed to the batch before heating. Seed crystals of sodium alunite was used to increase the crystal size of the alunite and shorten the filtering time.

The raw materials were: (1) Sludge 4000 g with a dry solids content of 10.7%, the dry solids containing 14.6% Al i.e. 62.5 g, (2) 235 g alunite-slurry from the previous batch as the seed material with a dry solids content of 14.5%, (3) H$_2$SO$_4$ 151.2 g (100%) i.e. 2.4 g/g Al, (4) Na$_2$SO$_4$ 312.44 g (20%) i.e. 62.5 g (100%) which equals to 1 g/g Al. Thus the mole ratio of added Na to Al was Namol/Al$_{mol}$=0.38, the theoretical being 0.33.

The processing was following: The sludge with the seed material was acidified to pH 3.5, sodium sulphate was added and heating was started. After 80 minutes 150° C. was reached. When the temperature exceeded 130° C., the precipitation started and pH began to decrease. After one hour pH remained constant (1.7). The batch was cooled, a sample was taken and the batch was allowed to settle. The dry solids content of the filter cake was 31%. The chemical analysis of the precipitate is given in Table 8.

TABLE 8

Chemical analysis of the precipitate of batch 3.

|    | Weight % | mol %  | mol/Al$_{mol}$ | Theoretical mol/Al$_{mol}$ |
|----|----------|--------|----------------|----------------------------|
| Al | 15       | 0.56   | 1              | 1                          |
| Na | 3.7      | 0.16   | 0.29           | 0.33                       |
| S  | 13       | 0.41   | 0.73           | 0.67                       |
| Fe | 0.18     |        |                |                            |
| C  | 10       |        |                |                            |

According to XRD the precipitate contained the following crystalline phases: NaAl$_3$(OH)$_6$(SO$_4$)$_2$ and 3 Al$_2$O$_3$.4SO$_3$ (10–15)H$_2$O. The distribution of the elements between the precipitate and the filtrate was that of Table 9.

TABLE 9

Distribution of the elements between the precipitate and the filtrate.

|    | Precipitate | Filtrate |
|----|-------------|----------|
| Al | 96.7%       | 3.3%     |
| Na | 83.6%       | 16.4%    |
| Fe | 50.4%       | 49.6%    |
| C  | 55.6%       | 44.4%    |

The sludge used in batches 1 and 2 was from the same purification plant whereas the sludge of batch 3 was from another water plant.

The theoretical amount of H$_2$SO$_4$ is 5.4 times the amount of Al in order to dissolve all aluminium at the same time. Expressed in moles the corresponding number is 1.5. The results of the three experiments are summarized in Table 10. As can be seen from the first row of Table 10, the ratio is much smaller than the theoretical value 5.4, which means that the dissolution reactions proceeds in the way explained above. In other words, only a small amount of sulphuric acid is needed to start the reaction. The rest of the needed sulphuric acid is produced during the reaction.

TABLE 10

Results of the three batch tests.

|                             | Batch 1 | Batch 2 | Batch 3 |
|-----------------------------|---------|---------|---------|
| H$_2$SO$_4$ g/g Al[1)]      | 1.81    | 2.0     | 2.4     |
| Na$_2$SO$_4$ g/g Al[2)]     | 1.0     | 1.02    | 1.0     |
| pH                          |         | 2.46    | 1.7     |
| Al in precipitate           | 14%     | 13%     | 15%     |
| Na in precipitate           | 2.6%    | 2.8%    | 3.7%    |
| S in precipitate            | 9%      | 10%     | 13%     |
| Fe in precipitate           | 0.65%   | 0.41%   | 0.18%   |
| C in precipitate            | 17%     | 15.5%   | 10%     |
| Yield of Al                 | 94.8%   | 95.6%   | 96.7%   |
| Yield of Na                 | 60%     | 68.8%   | 83.6%   |
| Yield of Fe                 | 30%     | 28.4%   | 50.4%   |
| Yield of C                  | 70%     | 77.7%   | 55.6%   |

[1)]theoretically 1.8 g/g Al
[2)]theoretically 1.1 g/g Al

EXAMPLE 3

The efficiency of washing with a NaOH solution for reducing the humus content of precipitated alunite (content of carbon 7.4%) was tested in the following way. Water was added to an alunite precipitate (3 g) so that a slurry (30 g) was obtained. To this slurry 9.6 ml of 1% NaOH solution was added so that the pH value was 10. The slurry was mixed for 30 minutes and then filtered. The obtained precipitate was washed with a small amount of water and dried at 105° C. overnight. The precipitate was weighted and analyzed for total carbon. The results were m=2.63 g and C=2.3%. The filtrate (37 ml) contained 100 mg/l of Al. According to this result NaOH can be effectively used for reducing the humus content. The filtrate can be recycled in the process so that the dissolved aluminium will not be lost.

EXAMPLE 4

To test the efficiency of alunite as a water treatment chemical, following coagulant chemicals were prepared. The first sample, hereinafter called as ALUNITE-ALS, was prepared in the following way. Dry alunite precipitate was calcined at 508° C. for 1 h. The X-ray diffractogram of the calcined precipitate confirmed that the material had an amorphous structure. According to the chemical analysis the calcined product contained 23% Al of which 3.3% was water soluble, 7.8% Na of which 6.6% was water soluble, 38% SO$_4$ of which 23% was water soluble. The mole ratio Al/Na was 2.51. The theoretical mole ratio in alunite is 3. The obtained calcined alunite (23% Al, 5.01 g) was mixed with water (10.04 g) to form a slurry and sulphuric acid (96%, 5.687 g) was slowly added to the slurry. After about ten minutes, the salt melt was poured onto a metal sheet to be crystallized. The obtained material contained: Al$_2$O$_3$ (total) 16.1%, Al$_2$O$_3$ (water soluble) 15.9%, Na 2.4%, SO$_4$ 42%, OH/Al 0.54, pH (1:10) 3.56. The hardened melt was ground to a powder which was dissolved in a small amount of water.

The second sample, hereafter called as ALUNITE-AVR, was prepared in the following way. Sulphuric acid (6.74 g)

was added to water (5.33 g). The mixture was heated and then boiling alunite (17% Al, 5.0 g) was added. After 15 minutes bauxite (2.45 g) was added. After about 30 minutes the mixture was poured onto a metal sheet. The obtained material contained: $Al_2O_3$ (total) 17.2%, $Al_2O_3$ (water soluble) 12.7%, Na 1.5%, $SO_4$ 50%, insoluble material 17.2%, pH (1:10) 1.15. The hardened melt was ground to a powder which was dissolved in a small amount of water.

The third sample, which served as the reference sample and which is hereafter called as AVR, contained AVR only. AVR is a commercial water treatment chemical containing 80% $Al_2(SO_4)_3 \times 14$–16 $H_2O$ and 16% $Fe_2(SO_4)_3 \times 9$ $H_2O$.

As already mentioned each coagulant chemical was dissolved in a small amount of water. The chemical was added in liquid form by a micropipette to a 1 liter vessel containing the waste water. Municipal waste water was used in the coagulation tests. The coagulation tests were performed in a conventional test apparatus (Kemira Kemi Flocculator). The results are shown in Table 11.

TABLE 11

Results of coagulation tests with a commercial Al-coagulant (AVR), a mixture of alunite and AVR and alunite. The values are percentage values expressing the reduction of turbidity and phosphorus after the coagulation.

| | Dosage of $Me^{3+}$ (mmol/l waste water) | | | | | |
|---|---|---|---|---|---|---|
| | 0.175 mmol/l | | | 0.26 mmol/l | | |
| | Alunite ALS | Alunite + AVR | AVR | Alunite ALS | Alunite + AVR | AVR |
| Decrease in turbidity (%) | 40 | 25 | 30 | 84 | 75 | 70 |
| Decrease in phosphorous (%) | 25 | 20 | 20 | 70 | 60 | 55 |

As shown in Table 11 two different doses of each chemical were tested. Each chemical was dosed so that the number of moles of added trivalent metal ions was the same for each chemical at each dose level.

As seen from Table 11, the ALUNITE-ALS gave the best results in terms of turbidity and reduction of phosphorous. ALUNITE-AVR gave results which were somewhat better than the results obtained for plain AVR. These results suggest that the performance of alunite is equal or better than that of the commercial coagulant.

EXAMPLE 5

In this experiment the feasibility of an acidified sludge as a coagulant chemical in waste water purification was studied. The raw sludge from the city of Helsinki contained 2.7% solids, which in turn contained 18% Al and 0.4% Fe. This raw sludge was flocculated with a commercial polymer (Fennopol A321). The obtained sludge was filtered to a dry solids content of 9.5%. The cake (pH 6.2) was acidified with a 2-M sulphuric acid until pH was 2.0. The acidified sludge contained: Total Al 12 g/l, water soluble Al 12 g/l, total Fe 240 mg/l, water soluble Fe 200 mg/l. The dissolution yield of Al was 100% and that of Fe 83%.

The sludge was used as a coagulant for a city sewage water. As a reference, a commercial Al-chemical (AVR) was used so that the dose of coagulant was the same in both tests. The dose was calculated in terms of mmol (Al+Fe)/l of sewage water. The test sequence was the following: fast mixing (400 rpm) for 15 s, slow mixing (30 rpm) for 15 min, settling 60 min. The results are shown in Table 12.

The results of this experiment show that the acidified sludge as such is not as good as AVR and to obtain the same purification effect a 2–3-fold amount of acidified sludge must be used. Part of the coagulation efficiency is lost because the coagulant must precipitate part of itself i.e. the impurities which come along with the acidified sludge. The acidified sludge contains heavy metals and organic impurities and therefore it cannot be used in drinking water purification.

TABLE 12

Results of coagulation tests with a commercial Al-coagulant (AVR) and an acidified sludge

| | Dosage of coagulant (mmol/l) | | | |
|---|---|---|---|---|
| | 0.15 | | 0.3 | |
| | Sludge | AVR | Sludge | AVR |
| Turbidity (NTU) | 32 | 18 | 13 | 6 |
| P (mg/l) | 1.4 | 0.6 | 0.4 | 0.15 |
| $COD_{Cr}$ (mg/l) | 135 | 100 | 110 | 85 |

EXAMPLE 6

In this experiment a humus sludge was obtained from a peat production area. The drainage water of this area was purified with a ferric chloride sulphate. The raw sludge was taken from the bottom of a settling pond. The sample had a dry solids content of 9.6%, which contained 24% Fe.

The sludge was acidified with sulphuric acid to pH 1 (1.9 g $H_2SO_4$/g Fe). The sludge could not be filtered. CST-value of the acidified sludge was >>400 s. In the dissolution stage 65.4% of total iron in the sludge was dissolved, for Fe(II) the yield was 66.3%. The relative percentage of Fe(II) and Fe (III) in the solution was 50.1% and 49.9%, respectively.

The acidified sludge was placed in a pressure reactor (7 l), warmed to 80° C. after which feeding of oxygen was started. The reason for oxidation was to oxidize $Fe^{2+} \rightarrow Fe^{3+}$ since the concentration of Fe(II) in the acidified solution was as high as 49.7% of total Fe. Another reason was to prevent reduction of Fe(III) at high temperature in the presence of organic matter. NaOH was fed to the reactor as a 10% solution (452 g/3968 g acidified sludge, 0.62 g NaOH/g Fe). Consumption of oxygen was 14.3 g (0.4 g/g $Fe^{2+}$), the total oxygen feed was 37.6 g. The reaction time was nearly 3 hours. During the precipitation reaction temperature varied between 120° C. and 150° C. and pH between 1.5 and 3.

The slurry from the precipitation stage was filtered and analyzed. The chemical analyses and the calculated yields of different elements are presented in Table 13. The precipitate was also analyzed by XRD. The measured diffractogram proved that the precipitate was crystalline jarosite.

TABLE 13

Analyses of sodium jarosite (245 g) and the filtrate (3159 g)

| Element or compound | Jarosite Conc. % | Amount g | Yield % | Filtrate Conc. |
|---|---|---|---|---|
| Tot-Fe | 19 | 46.56 | 65.2 | 0.79 |
| $Fe^{3+}$ | | 40.43 | 93.6 | |
| $Fe^{2+}$ | 2.5 | 6.13 | 21.7 | 0.7 |
| Na | 2.4 | 5.88 | 26.4 | 0.52 |
| $SO_4^{2-}$ | 19.5 | 47.78 | 35.1 | 2.8 |
| C | 21 | 51.46 | 72.1 | 0.63 |

Distribution of iron was the following: Fe(II) 13.2% and Fe(III) 86.8% in the jarosite and Fe(II) 88.9% and Fe(III) 11.1% in the filtrate. The molar ratios of the product were calculated and compared with theory. The values are given in table 14.

TABLE 14

Molar ratios of the jarosite product

| Mole ratio | Theory | Analyzed |
|---|---|---|
| Fe/Na | 3 | 3.3 |
| Fe/S | 1.5 | 1.7 |
| S/Na | 2 | 1.9 |

The product contained more iron in the experiment than in theory. It is possible, that the excess amount originated from the humus-bound iron, which was at divalent state.

The precipitation yield of Fe(III) was good. If the oxidation of Fe(II) had been better, the overall yield would also have been better than the 65% obtained in this experiment.

The dewaterability of the jarosite slurry was tested with CST measurements. The result was 47 s on the average. The thermally treated (0.5 h/130°–150° C.) acidified sludge (2.7% suspended solids) was also tested: average 33 s, but the slurry was very thixotropic.

A preliminary test was made to dissolve jarosite in sulphuric acid. It seemed to dissolve only partly. The slurry was filtered and the insoluble material was analyzed qualitatively by the XRF method. Following elements were identified: Fe, Ti, Cr, S.

According to the results from thermal analysis of precipitated jarosite, organic matter started burning at about 300° C. with an exothermal reaction. The dried jarosite precipitate was calcined at different temperatures. According to these results 1 hour at 325° C. is sufficient for a complete calcination. Ignition loss was 53.6%. The precipitate ignited at above conditions was analyzed with following results: Total Fe 40%, S 9%, C 0.5% Na 5.7%. The XRD analysis showed that the ignited product contained primarily $Fe_2O_3$.

EXAMPLE 7

Drinking water sludge in the city of Turku comes from the process where river water is precipitated with a commercial ferric chemical (Finnferri). The sludge is filtered by using a belt filter press. The raw sludge had a solids content of 12.9% and a CST value of 144 s. Analysis of the dry material: Total Fe 23%, $Fe^{2+}$ 2.5%, C 10.8% insoluble (in HCl 36%, ignition loss (1 h/800° C.) 29.8%, insoluble (in HCl) material in the remaining ignited portion 45%.

The dissolution in sulphuric acid was conducted at a temperature of 80° and pH 0.61. After separation of solids (15 min/3000 rpm, 25% of the batch) the solution was analyzed: Total Fe 2.2% (65% yield), $Fe^{2+}$ 0.59%, Cd 0.043 ppm, Cr 4.5 ppm, Ni 2.0 ppm, Pb 0.59 ppm, Zn 13 ppm. Because of the reasonably high temperature, iron was partly reduced during the dissolution period. The yield of iron was not good enough. It is possible that the removed originally insoluble material contained much iron thus decreasing the yield. If a longer delay time had been used, the yield would have been better.

Part of the solution (830 g, pH 1.29) was reacted in an autoclave with NaOH and oxygen to keep Fe at trivalent state. The warming-up time was 55 min until 130° C. was reached, reaction time was 3 h, pressure 6 bar and the consumption of oxygen was 13 g. The cooled slurry was filtered (fast, good filterability), washed, weighed (precipitate: 31.4 g dry, 3.9% of the batch, filtrate: 748.5 g, pH 0.8) and analyzed. The chemical analyses are shown in Table 15. The precipitate was also analyzed by XRD and the diffractogram proved that the product was crystalline $H_3O/K/Na$ $Fe_3(SO_4)_2(OH)_6$. According to qualitative XRF the products contained mainly Fe and S, and Ca, K, Al, Ti, Mo, Sr, Cr, Rb less than 1%. Molar ratios of the elements in the product are presented in Table 16.

TABLE 15

Chemical analyses of the precipitate and the filtrate.

| | Precipitate % | g | Yield-% | Filtrate % |
|---|---|---|---|---|
| Tot-Fe | 30.5 | 9.46 | 65 | 0.68 |
| $Fe^{2+}$ | | | | 0.23 |
| Na | 3.5 | 1.1 | | |
| S | 14 | 4.4 | | |
| C | 0.5 | 0.16 | 6.9 | 0.28 |
| Cr | 0.0066 | 0.002 | 12.9 | 0.0018 |

TABLE 16

Mole ratios of the jarosite product

| Mole ratio | Theory | Analyzed |
|---|---|---|
| Fe/Na | 3 | 3.6 |
| Fe/S | 1.5 | 1.3 |
| S/Na | 2 | 2.9 |

Part of the sodium jarosite cake was dissolved in HCl in order to make a 12% solution of Fe: jarosite (dry) 8.8, HCl 14.55 g, water 2.77 g. The mixture was stirred 3.5 h at 78°–84° C., cooled to 50° C. in 15 min and filtered. The washed insoluble cake constituted 1.04% of the batch i.e. 3.1% of jarosite. Analysis of the filtrate was: Total Fe 10.3% (0.184 mol-%), $Fe^{2+}$ 0.07, S 4.4% (0.138 mol-%), Cl 17% (0.479 mol-%), Cr 0.0021%, density 1.43 g/ml, pH (as such) <0, pH (as a 1% solution) 1.7. Free HCl was calculated to be 5.6%. The results show, that the dissolution time should have been even longer to get a commercial (12% Fe) product. The Cr-content was higher than in commercial ferric solutions. Its content could possibly be decreased by using even lower pH at the precipitation stage. Other toxic heavy metals were not seen by XRF.

EXAMPLE 8

In this experiment a ferric solution obtained by dissolving jarosite was used as a coagulant for a city sewage water. As a reference, a commercial ferric coagulant (FINNFERRI)

was used so that the dose of coagulant was the same in both tests. The dose was calculated in terms of mmol Fe/l of sewage water. The test sequence was the following: fast mixing (400 rpm) for 15 s, slow mixing (30 rpm) for 15 min, settling 60 min. The results are shown in Table 17.

TABLE 17

Results of coagulation tests with dissolved jarosite and a commercial ferric coagulant.

| | Dosage of coagulant (mmol/l) | | | |
|---|---|---|---|---|
| | 0.15 | | 0.3 | |
| | Jarosite | FINNFERRI | Jarosite | FINNFERRI |
| Turb. (NTU) | 25 | 32 | 2.5 | 4.0 |
| P (mg/l) | 1.5 | 3.0 | 0.07 | 0.11 |
| $COD_{Cr}$ (mg/l) | 130 | 145 | 85 | 90 |

According to the results the coagulant obtained from jarosite showed superior performance at both dosage levels with regard to turbidity, phosphorous content and COD compared to a commercial ferric coagulant.

The invention is not limited to above embodiments but it can be modified within the scope of the enclosed claims. For example, it is possible to use hydrochloric acid in the dissolution stage. It is essential in this stage to transform aluminium into soluble form. Then sulphates can separately be added to the solution for precipitation of aluminium.

We claim:

1. The method for the treatment of sludge obtained from such a water treatment process wherein an aluminium or iron chemical is used as a coagulant, so as to reduce the amount of sludge, comprising the steps of:
   a) treating the water treatment sludge with an inorganic acid to produce an acidic sludge solution comprising dissolved aluminium or iron,
   b) optionally separating insoluble material from the acidic sludge solution to produce an acidic solution comprising dissolved aluminium or iron,
   c) treating said acidic sludge solution or said acidic solution with a monovalent cation compound in the presence of sulphate ions in such conditions that the temperature is between 100° to 170° C. and the pH of the solution remains at a level where aluminium precipitates as an alunite compound or iron precipitates as a jarosite compound, and
   d) separating the precipitated alunite or jarosite compound from the remaining solution.

2. The method according to claim 1, wherein said inorganic acid comprises sulphuric acid, and said sulphate ions present in the precipitation step originates from said sulphuric acid.

3. The method according to claim 1, wherein said acidic sludge solution or said acidic solution comprises dissolved aluminium, said monovalent cation compound comprises a sodium compound with the molar ratio of Na to Al being at least 1 to 3, said precipitation is performed at a pH value of 0.5 to 4, and aluminium precipitates as sodium alunite.

4. The method according to claim 1, wherein said acidic sludge solution or said acidic solution comprises dissolved iron, said monovalent cation compound comprises a sodium compound with the molar ratio of Na to Fe being at least 1 to 3, said precipitation is performed at a pH value of −1 to 4, and iron precipitates as sodium jarosite.

5. The method according to claim 3, wherein said sodium compound comprises sodium hydroxide.

6. The method according to claim 3, wherein said sodium compound comprises a sodium salt.

7. The method according to claim 6, wherein an alkali is additionally added to said acidic sludge solution or said acidic solution.

8. The method according to claim 7, wherein said alkali comprises calcium hydroxide or oxide or magnesium hydroxide or oxide.

9. The method according to claim 2, wherein the dissolution step and the precipitation step are performed without an intermediate separation step, and wherein the molar ratio of sulphuric acid to Al or Fe present in the water treatment sludge is in the range of 0.5:1 to 1.5:1.

10. The method according to claim 2, wherein the dissolution step is followed by the separation step, and wherein the molar ratio of sulphuric acid to Al or Fe present in the water treatment sludge is at least 1.5:1.

11. The method according to claim 1 further comprising the steps of washing the separated alunite or jarosite compound with an alkali, and adding said alkali after the washing step to the precipitation step.

12. The method according to claim 11, wherein said alkali comprises sodium hydroxide, calcium hydroxide or oxide or magnesium hydroxide or oxide.

13. The method according to claim 1 further comprising the step of drying and/or calcining the separated and optionally washed alunite or jarosite compound.

14. The method according to claim 1 further comprising the step of treating the separated and optionally dried and/or calcined alunite or jarosite compound with an inorganic acid to produce a solution comprising dissolved aluminium or iron useful as a coagulant chemical.

15. The method according to claim 1, wherein the dissolution step and the precipitation step are performed without an intermediate separation step in the same reaction vessel successively or essentially simultaneously.

16. The method according to claim 1, wherein the dry solids content of said water treatment sludge is above 1% by weight.

17. The method according to claim 2, wherein said acidic sludge solution or said acidic solution comprises dissolved aluminium, said monovalent cation compound comprises a sodium compound with the molar ratio of Na to Al being at least 1 to 3, said precipitation is performed at a pH value of 0.5 to 4, and aluminium precipitates as sodium alunite.

18. The method according to claim 2, wherein said acidic sludge solution or said acidic solution comprises dissolved iron, said monovalent cation compound comprises a sodium compound with the molar ratio of Na to Fe being at least 1 to 3, said precipitation is performed at a pH value of −1 to 4, and iron precipitates as sodium jarosite.

19. The method according to claim 4, wherein said sodium compound comprises sodium hydroxide.

20. The method according to claim 4, wherein said sodium compound comprises a sodium salt.

21. The method according to claim 11 further comprising the step of drying and/or calcining the separated and optionally washed alunite or jarosite compound.

22. The method according to claim 13 further comprising the step of treating the separated and optionally dried and/or calcined alunite or jarosite compound with an inorganic acid to produce a solution comprising dissolved aluminium or iron useful as a coagulant chemical.

23. The method according to claim 17, wherein said sodium compound comprises sodium hydroxide.

24. The method according to claim 17, wherein said sodium compound comprises a sodium salt.

25. The method according to claim 18, wherein said sodium compound comprises sodium hydroxide.

26. The method according to claim 18, wherein said sodium compound comprises a sodium salt.

27. The method according to claim 24, wherein an alkali is additionally added to said acidic sludge solution or said acidic solution.

28. The method according to claim 26, wherein an alkali is additionally added to said acidic sludge solution or said acidic solution.

29. The method according to claim 27, wherein said alkali comprises calcium hydroxide or oxide or magnesium hydroxide or oxide.

30. The method according to claim 28, wherein said alkali comprises calcium hydroxide or oxide or magnesium hydroxide or oxide.

31. The method according to claim 20, wherein an alkali is additionally added to said acidic sludge solution or said acidic solution.

32. The method according to claim 31, wherein said alkali comprises calcium hydroxide or oxide or magnesium hydroxide or oxide.

33. The method according to claim 21 further comprising the step of treating the separated and optionally dried and/or calcined alunite or jarosite compound with an inorganic acid to produce a solution comprising dissolved aluminium or iron useful as a coagulant chemical.

34. The method according to claim 6, wherein said sodium salt is sodium sulphate.

35. The method according to claim 20, wherein said sodium salt is sodium sulphate.

36. The method according to claim 24, wherein said sodium salt is sodium sulphate.

37. The method according to claim 26, wherein said sodium salt is sodium sulphate.

* * * * *